(12) United States Patent
Zhang et al.

(10) Patent No.: US 10,194,400 B2
(45) Date of Patent: Jan. 29, 2019

(54) POWER CONTROL METHOD, COMMUNICATIONS SYSTEM, AND RELATED DEVICE

(71) Applicant: Huawei Technologies Co., Ltd., Shenzhen (CN)

(72) Inventors: Tao Zhang, Beijing (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 15/425,650

(22) Filed: Feb. 6, 2017

(65) Prior Publication Data

US 2017/0150454 A1     May 25, 2017

Related U.S. Application Data

(63) Continuation of application No. PCT/CN2014/083901, filed on Aug. 7, 2014.

(51) Int. Cl.
*H04W 52/14* (2009.01)
*H04L 1/00* (2006.01)
(Continued)

(52) U.S. Cl.
CPC .......... *H04W 52/146* (2013.01); *H04L 1/005* (2013.01); *H04W 8/186* (2013.01); *H04W 52/08* (2013.01);
(Continued)

(58) Field of Classification Search
CPC ... H04W 52/146; H04W 52/08; H04W 52/34; H04W 52/283; H04W 52/386;
(Continued)

(56) References Cited

U.S. PATENT DOCUMENTS

| | | | |
|---|---|---|---|
| 9,763,203 B2 * | 9/2017 | Dinan | H04W 52/146 |
| 2010/0331037 A1 * | 12/2010 | Jen | H04W 52/146 455/522 |

(Continued)

FOREIGN PATENT DOCUMENTS

| | | |
|---|---|---|
| CN | 102300301 A | 12/2011 |
| CN | 103139888 A | 6/2013 |

(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC): Protocol Specification (Release 12)," 3GPP TS 36.331 V12.2.0, Jun. 2014 Technical Specification, 365 pages.

(Continued)

*Primary Examiner* — Ajay Cattungal
(74) *Attorney, Agent, or Firm* — Slater Matsil, LLP

(57) ABSTRACT

A power control method, a communications system, and a related device are provided, applicable to the field of communications technologies. A base station sends power control commands of multiple serving cells in one serving cell of terminal device. Embodiments provide a power control method, a communications system, and a related device, so as to send commands for adjusting physical uplink control channel (PUCCH) transmit power in one serving cell.

5 Claims, 3 Drawing Sheets

(51) Int. Cl.
*H04W 52/08* (2009.01)
*H04W 52/34* (2009.01)
*H04W 72/04* (2009.01)
*H04W 8/18* (2009.01)
*H04W 52/28* (2009.01)
*H04W 52/38* (2009.01)
*H04W 52/16* (2009.01)
*H04W 52/32* (2009.01)

(52) U.S. Cl.
CPC ......... *H04W 52/283* (2013.01); *H04W 52/34* (2013.01); *H04W 52/386* (2013.01); *H04W 72/042* (2013.01); *H04W 52/16* (2013.01); *H04W 52/325* (2013.01)

(58) Field of Classification Search
CPC . H04W 52/16; H04W 52/325; H04W 72/042; H04W 8/186
See application file for complete search history.

(56) References Cited

U.S. PATENT DOCUMENTS

| | | |
|---|---|---|
| 2011/0319121 A1 | 12/2011 | Jen |
| 2012/0208583 A1 | 8/2012 | Chung et al. |
| 2013/0272232 A1* | 10/2013 | Dinan .................. H04W 52/386 370/329 |
| 2014/0169331 A1 | 6/2014 | Yang et al. |
| 2015/0156764 A1* | 6/2015 | Yang ...................... H04L 1/0076 370/329 |
| 2015/0358917 A1 | 12/2015 | Gao et al. |
| 2016/0119970 A1* | 4/2016 | Lee ........................ H04W 24/08 370/328 |
| 2016/0165640 A1* | 6/2016 | Yang ...................... H04W 74/08 370/336 |

FOREIGN PATENT DOCUMENTS

| | | |
|---|---|---|
| CN | 103874186 A | 6/2014 |
| CN | 103929803 A | 7/2014 |
| EP | 2945442 A1 | 11/2015 |
| WO | 2014108094 A1 | 7/2014 |

OTHER PUBLICATIONS

TSG RAN WG1 "LS on the Support of PUCCH on Two Serving Cells in CA" 3GPP TSG RAN WG1 Meeting #77, R1-142769, Seoul, Korea, May 19-23, 2014, 2 pages.

ZTE "Issues on UL TPC Transmission for Carrier Aggregation" 3GPP TSG RAN WG1 Meeting #61bis, R1-103603, Dresden, Germany, Jun. 28-Jul. 2, 2010, 3 pages.

\* cited by examiner

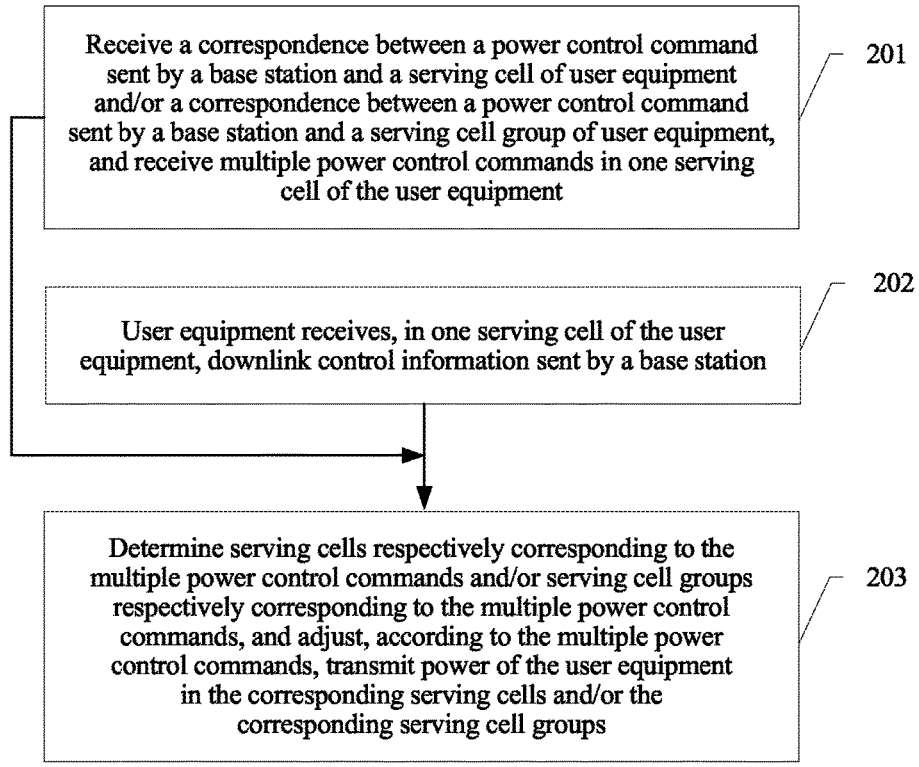

POWER CONTROL METHOD, COMMUNICATIONS SYSTEM, AND RELATED DEVICE

CROSS-REFERENCE TO RELATED APPLICATIONS

This application is a continuation of International Application No. PCT/CN2014/083901, filed on Aug. 7, 2014, the disclosure of which is hereby incorporated by reference in its entirety.

TECHNICAL FIELD

The present embodiments relate to the field of communications technologies, and in particular, to a power control method, a communications system, and a related device.

BACKGROUND

In a mobile communications system, terminal device (for example user equipment (UE)) may have multiple serving cells at a same time. One serving cell is referred to as a primary cell (PCell), and a remaining serving cell is referred to as a secondary cell (SCell). The terminal device may send, in the primary cell and one or more secondary cells, a physical uplink control channel (PUCCH) to a base station (BS).

Power at which the terminal device sends the PUCCH in each cell is controlled by the base station. In the prior art, the base station sends, to the terminal device by adding a command to common search space of each cell, the command for instructing the terminal device to adjust PUCCH transmit power in each cell. In this case, a quantity of serving cells in which the terminal device can send the PUCCH is relatively large, and common search space is also relatively large. Therefore, when the terminal device detects information sent by the base station to the terminal device, common search space that the terminal device needs to detect is relatively large, that is, a quantity of blind detection is relatively large.

SUMMARY

Embodiments provide a power control method, a communications system, and a related device, so as to send commands for adjusting physical uplink control channel (PUCCH) transmit power in one serving cell, thereby reducing a quantity of blind detection.

According to a first aspect of the embodiments, a power control apparatus is provided, including a generation unit and a sending unit, where the generation unit is configured to generate a correspondence between a power control command and a serving cell of the terminal device and/or a correspondence between a power control command and a serving cell group of the terminal device; or generate downlink control information. The downlink control information includes multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group. Additionally, the sending unit is configured to after the generation unit generates the correspondence, send the generated correspondence, and send multiple power control commands in one serving cell of the terminal device according to the correspondence generated by the generation unit. In another example, the sending unit is configured to after the generation unit generates the downlink control information, send, in one serving cell of the terminal device, the downlink control information generated by the generation unit. Also, a power control command in the multiple power control commands is used to instruct the terminal device to adjust transmit power of the terminal device in a serving cell and/or a serving cell group.

In a first possible implementation manner of the first aspect of the embodiments, the generation unit is specifically configured to generate a first correspondence, and the first correspondence is a correspondence between identifier information of a power control command and identifier information of a serving cell of the terminal device and/or a correspondence between identifier information of a power control command and identifier information of a serving cell group of the terminal device; and the sending unit is specifically configured to send the first correspondence generated by the generation unit, and send the multiple power control commands in one serving cell of the terminal device according to the first correspondence generated by the generation unit, where the power control commands include identifier information of the power control commands; or send the multiple power control commands and identifier information of the multiple power control commands in one serving cell of the terminal device.

In a second possible implementation manner of the first aspect of the embodiments, the generation unit is specifically configured to generate a second correspondence, where the second correspondence is a correspondence between a scrambling code used for transmitting a power control command and identifier information of a serving cell of the terminal device and/or a correspondence between a scrambling code used for transmitting a power control command and identifier information of a serving cell group of the terminal device; and the sending unit is specifically configured to send the second correspondence generated by the generation unit, and respectively send, according to the second correspondence, the multiple power control commands in one serving cell of the terminal device by using scrambling codes corresponding to the multiple power control commands.

In a third possible implementation manner of the first aspect of the embodiments, the generation unit is specifically configured to generate a third correspondence, where the third correspondence is a correspondence between information about a resource used for transmitting a power control command and identifier information of a serving cell of the terminal device and/or a correspondence between information about a resource used for transmitting a power control command and identifier information of a serving cell group of the terminal device; and the sending unit is specifically configured to send the third correspondence generated by the generation unit, and respectively send, according to the third correspondence generated by the generation unit, the multiple power control commands in one serving cell of the terminal device by using resources corresponding to the multiple power control commands.

In a fourth possible implementation manner of the first aspect of the embodiments, the generation unit is specifically configured to generate a fourth correspondence, where the fourth correspondence is a correspondence between location information that is of a power control command and that is in the downlink control information sent by the power control apparatus and identifier information of a serving cell of the terminal device and/or a correspondence between location information that is of a power control command and that is in the downlink control information sent by the power control apparatus and identifier information of a serving cell group of the terminal device; and the sending unit is specifically configured to send the fourth correspondence generated by the generation unit, and send the downlink control information in one serving cell of the terminal device according to the fourth correspondence, where the downlink control command includes the multiple power control commands.

With reference to any one of the first aspect or the first to the fourth possible implementation manners of the first aspect of the embodiments, in a fifth possible implementation manner of the first aspect of the embodiments, the sending unit is specifically configured to send the multiple power control commands in common search space of a primary cell of the terminal device according to the correspondence generated by the generation unit, or is specifically configured to send, in common search space of a primary cell of the terminal device, the downlink control information generated by the generation unit.

According to a second aspect of the embodiments, a power control apparatus is provided, including a receiving unit, configured to receive a correspondence between a power control command sent by a base station and a serving cell of the power control apparatus and/or a correspondence between a power control command sent by a base station and a serving cell group of the power control apparatus, and receive, in one serving cell of the power control apparatus, multiple power control commands sent by the base station. In another example, the receive unit is configured to receive downlink control information in one serving cell of the power control apparatus. The downlink control information includes multiple power control commands and identifier information of serving cells respectively corresponding to the multiple power control commands and/or identifier information of serving cell groups respectively corresponding to the multiple power control commands. In another example, the downlink control information includes: multiple power control commands and identifier information of one serving cell and/or identifier information of one serving cell group. The power control apparatus also includes a transmission adjustment unit, configured to determine, according to the correspondence or the downlink control information received by the receiving unit, the serving cells respectively corresponding to the multiple power control commands and/or the serving cell groups respectively corresponding to the multiple power control commands, and adjust, according to each power control command, transmit power of the power control apparatus in a corresponding serving cell and/or a corresponding serving cell group, where a power control command in the multiple power control commands is used to instruct the power control apparatus to adjust transmit power of the power control apparatus in a serving cell and/or a serving cell group.

In a first possible implementation manner of the second aspect of the embodiments, the receiving unit is specifically configured to: receive a first correspondence, where the first correspondence is a correspondence between identifier information of a power control command sent by the base station and identifier information of a serving cell of the power control apparatus and/or a correspondence between identifier information of a power control command sent by the base station and identifier information of a serving cell group of the power control apparatus; and receive, in one serving cell of the power control apparatus, the multiple power control commands sent by the base station and identifier information that is of the multiple power control commands and that is sent by the base station, or receive, in one serving cell of the power control apparatus, the multiple power control commands sent by the base station, where the power control commands include identifier information of the power control commands; and the transmission adjustment unit is specifically configured to determine, according to the identifier information of the multiple power control commands and the first correspondence that are received by the receiving unit, the serving cells respectively corresponding to the multiple power control commands and/or the serving cell groups respectively corresponding to the multiple power control commands.

In a second possible implementation manner of the second aspect of the embodiments, the receiving unit is specifically configured to receive a second correspondence, where the second correspondence is a correspondence between a scrambling code used by the base station to send a power control command and identifier information of a serving cell of the power control apparatus and/or a correspondence between a scrambling code used by the base station to send a power control command and identifier information of a serving cell group of the power control apparatus; and the transmission adjustment unit is specifically configured to determine, according to the second correspondence received by the receiving unit and scrambling codes respectively used by the receiving unit to receive the multiple power control commands, the serving cells respectively corresponding to the multiple power control commands and/or the serving cell groups respectively corresponding to the multiple power control commands.

In a third possible implementation manner of the second aspect of the embodiments, the receiving unit is specifically configured to receive a third correspondence, where the third correspondence is a correspondence between information about a resource used by the base station to send a power control command and identifier information of a serving cell of the power control apparatus and/or a correspondence between information about a resource used by the base station to send a power control command and identifier information of a serving cell group of the power control apparatus; and the transmission adjustment unit is specifically configured to determine, according to the third correspondence received by the receiving unit and resources used by the power receiving unit to receive the multiple power control commands, the serving cells respectively corresponding to the multiple power control commands and/or the serving cell groups respectively corresponding to the multiple power control commands.

In a fourth possible implementation manner of the second aspect of the embodiments, the receiving unit is specifically configured to: receive a fourth correspondence, where the fourth correspondence is a correspondence between location information that is of the power control command and that is in the downlink control information sent by the base station and identifier information of a serving cell of the power control apparatus and/or a correspondence between location information of the power control command in the downlink control information sent by the base station and identifier information of a serving cell group of the power control apparatus; and receive the downlink control information in one serving cell of the power control apparatus, where the downlink control information includes multiple power control commands; and the transmission adjustment unit is specifically configured to determine, according to the fourth correspondence received by the receiving unit and location information that is of the multiple power control commands and is in the downlink control information and that is received by the receiving unit, the serving cells respectively corresponding to the multiple power control commands and/or the serving cell groups respectively corresponding to the multiple power control commands.

With reference to any one of the second aspect or the first to the fourth possible implementation manners of the second aspect of the embodiments, in a fifth possible implementation manner of the second aspect of the embodiments, the receiving unit is specifically configured to receive the multiple power control commands in common search space of a primary cell of the terminal device, or is specifically configured to receive the downlink control information in common search space of a primary cell of the terminal device.

According to a third aspect of the embodiments, a communications system is provided, including a base station and terminal device, where the base station is the power control apparatus according to any one of the first aspect or the first to the fifth possible implementation manners of the first aspect of the embodiments, and the terminal device is the power control apparatus according to any one of the second aspect or the first to the fifth possible implementation manners of the second aspect of the embodiments.

According to a fourth aspect of the embodiments, a power control method is provided, including: generating, by a base station, a correspondence between a power control command sent by the base station and a serving cell of terminal device and/or a correspondence between a power control command sent by the base station and a serving cell group of terminal device; or generating, by the base station, downlink control information, where the downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group; and when the correspondence is generated, sending, by the base station, the correspondence, and sending the multiple power control commands in one serving cell of the terminal device according to the correspondence; or when the downlink control information is generated, sending, by the base station, the downlink control information in one serving cell of the terminal device, where a power control command in the multiple power control commands is used to instruct the terminal device to adjust transmit power of the terminal device in a serving cell and/or a serving cell group.

In a first possible implementation manner of the fourth aspect of the embodiments, the generating, by a base station, a correspondence between a power control command sent by the base station and a serving cell of terminal device and/or a correspondence between a power control command sent by the base station and a serving cell group of terminal device specifically includes: generating, by the base station, a first correspondence, where the first correspondence is a correspondence between identifier information of a power control command and identifier information of a serving cell of the terminal device and/or a correspondence between identifier information of a power control command and identifier information of a serving cell group of the terminal device; and sending, by the base station, the multiple power control commands in one serving cell of the terminal device according to the correspondence specifically includes: sending, by the base station, the multiple power control commands and identifier information of the multiple power control commands in one serving cell of the terminal device, or sending the multiple power control commands in one serving cell of the terminal device, where the power control commands include identifier information of the power control commands.

In a second possible implementation manner of the fourth aspect of the embodiments, the generating, by a base station, a correspondence between a power control command sent by the base station and a serving cell of terminal device and/or a correspondence between a power control command sent by the base station and a serving cell group of terminal device specifically includes: generating, by the base station, a second correspondence, where the second correspondence is a correspondence between a scrambling code used by the base station to send a power control command and identifier information of a serving cell of the terminal device and/or a correspondence between a scrambling code used by the base station to send a power control command and identifier information of a serving cell group of the terminal device; and sending, by the base station, the multiple power control commands in one serving cell of the terminal device according to the correspondence specifically includes: respectively sending, by the base station according to the second correspondence, the multiple power control commands in one serving cell of the terminal device by using scrambling codes corresponding to the multiple power control commands.

In a third possible implementation manner of the fourth aspect of the embodiments, the generating, by a base station, a correspondence between a power control command sent by the base station and a serving cell of terminal device and/or a correspondence between a power control command sent by the base station and a serving cell group of terminal device specifically includes: generating, by the base station, a third correspondence, where the third correspondence is a correspondence between information about a resource used by the base station to send a power control command and identifier information of a serving cell of the terminal device and/or a correspondence between information about a resource used by the base station to send a power control command and identifier information of a serving cell group of the terminal device; and sending, by the base station, the multiple power control commands in one serving cell of the terminal device according to the correspondence specifically includes: respectively sending, by the base station according to the third correspondence, the multiple power control commands in one serving cell of the terminal device by using resources corresponding to the multiple power control commands.

In a fourth possible implementation manner of the fourth aspect of the embodiments, the generating, by a base station, a correspondence between a power control command sent by the base station and a serving cell of terminal device and/or a correspondence between a power control command sent by the base station and a serving cell group of terminal device specifically includes: generating, by the base station, a fourth correspondence, where the fourth correspondence is a correspondence between location information that is of a power control command and that is in the downlink control information sent by the base station and identifier information of a serving cell of the terminal device and/or a correspondence between location information that is of a power control command and that is in the downlink control information sent by the base station and identifier information of a serving cell group of the terminal device; and sending, by the base station, the multiple power control commands in one serving cell of the terminal device according to the correspondence specifically includes: respectively sending, by the base station, the downlink control information in one serving cell of the terminal device according to the fourth correspondence, where the downlink control information includes the multiple power control commands.

According to a fifth aspect of the embodiments, a power control method is provided, including: receiving, by terminal device, a correspondence between a power control command sent by a base station and a serving cell of the terminal device and/or a correspondence between a power control command sent by a base station and a serving cell group of the terminal device, and receiving, in one serving cell, multiple power control commands sent by the base station; or receiving, by the terminal device in one serving cell, downlink control information sent by the base station, where the downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group; and determining, by the terminal device according to the correspondence or the downlink control information, the serving cells respectively corresponding to the multiple power control commands and/or the serving cell groups respectively corresponding to the multiple power control commands, and adjusting, according to the power control commands, transmit power of the terminal device in the corresponding serving cells and/or the corresponding serving cell groups, where a power control command in the multiple power control commands is used to instruct the terminal device to adjust transmit power of the terminal device in a serving cell and/or a serving cell group.

In a first possible implementation manner of the fifth aspect of the embodiments, the receiving, by terminal device, a correspondence between a power control command sent by a base station and a serving cell of the terminal device and/or a correspondence between a power control command sent by a base station and a serving cell group of the terminal device specifically includes: receiving, by the terminal device, a first correspondence, where the first correspondence is a correspondence between identifier information of a power control command and identifier information of a serving cell of the terminal device and/or a correspondence between identifier information of a power control command and identifier information of a serving cell group of the terminal device; the receiving, by the terminal device in one serving cell, multiple power control commands sent by the base station specifically includes: receiving, by the terminal device in one serving cell, the multiple power control commands and identifier information of the multiple power control commands sent by the base station, or receiving, by the terminal device in one serving cell of the terminal device, the multiple power control commands sent by the base station, where the power control commands include identifier information of the power control commands; and the determining, by the terminal device according to the correspondence, the serving cells respectively corresponding to the multiple power control commands and/or the serving cell groups respectively corresponding to the multiple power control commands specifically includes: determining, by the terminal device according to the first correspondence and the identifier information of the multiple power control commands, the serving cells respectively corresponding to the multiple power control commands and/or the serving cell groups respectively corresponding to the multiple power control commands.

In a second possible implementation manner of the fifth aspect of the embodiments, the receiving, by terminal device, a correspondence between a power control command sent by a base station and a serving cell of the terminal device and/or a correspondence between a power control command sent by a base station and a serving cell group of the terminal device specifically includes: receiving, by the terminal device, a second correspondence, where the second correspondence is a correspondence between a scrambling code used by the base station to send a power control command and identifier information of a serving cell of the terminal device and/or a correspondence between a scrambling code used by the base station to send a power control command and identifier information of a serving cell group of the terminal device; and the determining, by the terminal device according to the correspondence, the serving cells respectively corresponding to the multiple power control commands and/or the serving cell groups respectively corresponding to the multiple power control commands specifically includes: determining, by the terminal device according to the second correspondence and scrambling codes respectively used by the terminal device to receive the multiple power control commands, the serving cells respectively corresponding to the multiple power control commands and/or the serving cell groups respectively corresponding to the multiple power control commands.

In a third possible implementation manner of the fifth aspect of the embodiments, the receiving, by terminal device, a correspondence between a power control command sent by a base station and a serving cell of the terminal device and/or a correspondence between a power control command sent by a base station and a serving cell group of the terminal device specifically includes: receiving, by the terminal device, a third correspondence, where the third correspondence is a correspondence between information about a resource used by the base station to send a power control command and identifier information of a serving cell of the terminal device and/or a correspondence between information about a resource used by the base station to send a power control command and identifier information of a serving cell group of the terminal device; and the determining, by the terminal device according to the correspondence, the serving cells respectively corresponding to the multiple power control commands and/or the serving cell groups respectively corresponding to the multiple power control commands specifically includes: determining, by the terminal device according to the third correspondence and resources used by the terminal device to receive the multiple power control commands, the serving cells respectively corresponding to the multiple power control commands and/or the serving cell groups respectively corresponding to the multiple power control commands.

In a fourth possible implementation manner of the fifth aspect of the embodiments, the receiving, by terminal device, a correspondence between a power control command sent by a base station and a serving cell of the terminal device and/or a correspondence between a power control command sent by a base station and a serving cell group of the terminal device specifically includes: receiving, by the terminal device, a fourth correspondence, where the fourth correspondence is a correspondence between location information that is of a power control command and that is in the downlink control information sent by the base station and identifier information of a serving cell of the terminal device and/or a correspondence between location information that is of a power control command and that is in the downlink control information sent by the base station and identifier information of a serving cell group of the terminal device; the receiving, by the terminal device in one serving cell of the terminal device, the multiple power control commands sent by the base station specifically includes: receiving, by the terminal device, the control information in one serving cell, where the downlink control information includes the multiple power control commands; and the determining, by the terminal device according to the correspondence, the serving cells respectively corresponding to the multiple power control commands and/or the serving cell groups respectively corresponding to the multiple power control commands specifically includes: determining, by the terminal device according to the fourth correspondence and locations that are of the received multiple power control commands and that are in the downlink control information, the serving cells respectively corresponding to the multiple power control commands and/or the serving cell groups respectively corresponding to the multiple power control commands.

In the embodiments, a base station sends power control commands of multiple serving cells in one serving cell of terminal device, so that when actively detecting information sent by the base station to the terminal device, the terminal device performs detection in only one serving cell of the terminal device. However, in the prior art, the base station sends, to the terminal device by adding a command to common search space of each cell, the command for instructing the terminal device to adjust PUCCH transmit power in each serving cell, and the terminal device performs detection in multiple serving cells. According to the method in the embodiments, space that the terminal device needs to detect can be reduced, thereby reducing a quantity of blind detection.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show merely some embodiments, and a person of ordinary skill in the art may still derive other drawings from these accompanying drawings without creative efforts.

FIG. 6 is a flowchart of another power control method according to an embodiment;

FIG. 7 is a schematic diagram of a format of downlink control indicator (DCI) sent by a base station to terminal device according to an application embodiment; and FIG. 8 is a schematic diagram of another format of DCI sent by a base station to terminal device according to an application embodiment.

DETAILED DESCRIPTION OF ILLUSTRATIVE EMBODIMENTS

The following clearly and describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope of the present embodiments.

In the specification, claims, and accompanying drawings of the present embodiments, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
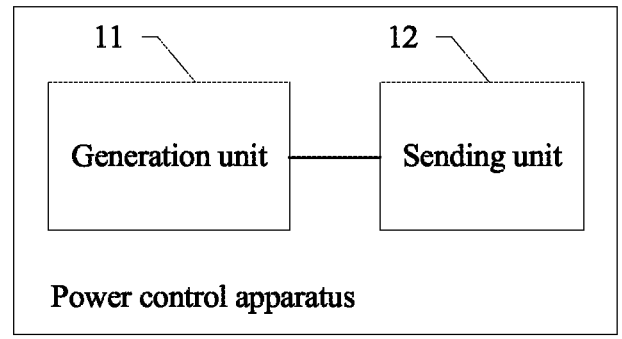
FIG. 1 is a schematic structural diagram of a power control apparatus according to an embodiment.

An embodiment provides a power control apparatus such as a base station. A schematic structural diagram of the power control apparatus is shown in FIG. 1, and the power control apparatus includes a generation unit 11 and a sending unit 12.

The generation unit 11 is configured to generate a correspondence between a power control command and a serving cell of the terminal device and/or a correspondence between a power control command and a serving cell group of the terminal device; or generate downlink control information. The downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group.

The correspondence between a power control command and a serving cell the terminal device and/or a correspondence between a power control command and a serving cell group of the terminal device are/is information indicating that a specific sent power control command is used to control transmit power at which the terminal device transmits uplink information in a specific serving cell and/or a specific serving cell group. The terminal device can transmit the uplink information in only one serving cell in a serving cell group.

The uplink information herein may be information such as a physical uplink control channel (PUCCH), or an uplink signal, for example, a sounding reference signal (SRS) and a physical uplink shared channel (PUSCH). That the uplink information is the PUCCH is used as an example. A secondary cell in which the terminal device can send the PUCCH is referred to as PUCCH SCell (PSCell). Terminal device may have one or more PSCells, and a primary cell and each PSCell belong to different serving cell groups. The terminal device can transmit the PUCCH in only one serving cell in a serving cell group.

It should be noted that if the downlink control information generated by the generation unit 11 may include identifier information of one serving cell and/or identifier information of one serving cell group, the multiple power control commands are all used to instruct the terminal device to adjust transmit power of the terminal device in the serving cell or the serving cell group identified by the identifier information.

If the downlink control information generated by the generation unit 11 includes: the multiple power control commands and identifier information of multiple serving cells and/or identifier information of multiple serving cell groups, and each power control command is associated with identifier information of one serving cell and/or identifier information of one serving cell group. For example, identifier information and a power control command are adjacently associated. In this way, a power control command is used to instruct the terminal device to adjust transmit power in a serving cell and/or a serving cell group identified by identifier information associated with the power control command.

The sending unit 12 is configured to: after the generation unit 11 generates the correspondence, send the generated correspondence, and send multiple power control commands in one serving cell of the terminal device according to the correspondence generated by the generation unit 11; or after the generation unit 11 generates the downlink control information, send, in one serving cell of the terminal device, the downlink control information generated by the generation unit. Specifically, the downlink control information may be sent in common search space of a primary cell of the terminal device.

A power control command in the multiple power control commands is used to instruct the terminal device to adjust transmit power of the terminal device in a serving cell and/or a serving cell group, and different power control commands are used to instruct the terminal device transmit power of the terminal device in different serving cells and/or different serving cell groups.

The sending unit 12 sends the multiple power control commands in one serving cell. Specifically, the sending unit 12 sends the power control commands on a part of resources, such as common search space, of one serving cell of the terminal device, specifically, may send the power control commands in common search space of the primary cell of the terminal device. Specifically, the sending unit 12 may add the multiple power control commands to the downlink control information (DCI) and send the downlink control information in common search space of one serving cell. A power control command herein may be a transmit power control (TPC) command.

It can be learned that in this embodiment, a sending unit 12 of a power control apparatus sends power control commands of multiple serving cells in one serving cell of terminal device, so that when detecting information sent by the power control apparatus to the terminal device, the terminal device performs detection in only one serving cell of the terminal device. However, in the prior art, the base station sends, to the terminal device by adding a command to common search space of each cell, the command for instructing the terminal device to adjust PUCCH transmit power in each serving cell, and the terminal device performs detection in multiple serving cells. According to the apparatus in this embodiment, space that the terminal device needs to detect can be reduced, thereby reducing a quantity of blind detection.

It should be noted that in a specific embodiment, a manner in which the generation unit 11 generates the correspondence and the sending unit 12 sends the multiple power control commands may include but is not limited to the following manners.

(1) The generation unit 11 is specifically configured to generate a first correspondence, and the first correspondence is a correspondence between identifier information (such as a number) of a power control command and identifier information of a serving cell of the terminal device and/or a correspondence between identifier information of a power control command and identifier information of a serving cell group of the terminal device. In this case, the sending unit 12 sends the first correspondence generated by the generation unit 11, and sends the multiple power control commands in one serving cell of the terminal device according to the first correspondence generated by the generation unit 11, where the power control commands include identifier information of the power control commands; or sends the multiple power control commands and identifier information of the multiple power control commands in one serving cell of the terminal device. For example, the multiple power control commands are numbered according to a sending sequence, and numbers are used as the identifier information of the power control commands.

(2) The generation unit 11 is specifically configured to generate a second correspondence, where the second correspondence is a correspondence between a scrambling code used for transmitting a power control command and identifier information of a serving cell of the terminal device and/or a correspondence between a scrambling code used for transmitting a power control command and identifier information of a serving cell group of the terminal device.

In this case, specifically, the sending unit 12 respectively sends, according to the second correspondence generated by the generation unit 11, the multiple power control commands in one serving cell of the terminal device by using scrambling codes corresponding to the multiple power control commands, that is, sends different power control commands by using different scrambling codes. Specifically, a cyclic redundancy check (CRC) code is first obtained by using a power control command, and then a scrambled CRC code is obtained by specific calculation (generally, exclusive OR calculation) performed on the CRC code by using a scrambling code corresponding to the power control command, and finally, the power control command and the scrambled CRC code are sent.

(3) The generation unit 11 is specifically configured to generate a third correspondence, where the third correspondence is a correspondence between information about a resource used for transmitting a power control command and identifier information of a serving cell of the terminal device and/or a correspondence between information about a resource used for transmitting a power control command and identifier information of a serving cell group of the terminal device. In this way, the sending unit 12 respectively sends, according to the third correspondence generated by the generation unit 11, the multiple power control commands in one serving cell of the terminal device by using resources corresponding to the multiple power control commands, that is, sends different power control commands on different resources.

(4) The generation unit 11 is specifically configured to generate a fourth correspondence, where the fourth correspondence is a correspondence between location information that is of a power control command and that is in the downlink control command sent by the power control apparatus and identifier information of a serving cell of the terminal device and/or a correspondence between location information that is of a power control command and that is in the downlink control command sent by the power control apparatus and identifier information of a serving cell group of the terminal device. In this way, the sending unit 12 sends the downlink control information in one serving cell of the terminal device according to the fourth correspondence generated by the generation unit 11. The downlink control command includes the multiple power control commands. That is, the sending unit 12 sends the multiple power control commands according to the location information in the fourth correspondence.

It should be noted that the generation unit 11 may generate a correspondence in a manner combining the foregoing four manners.

Figure 2:
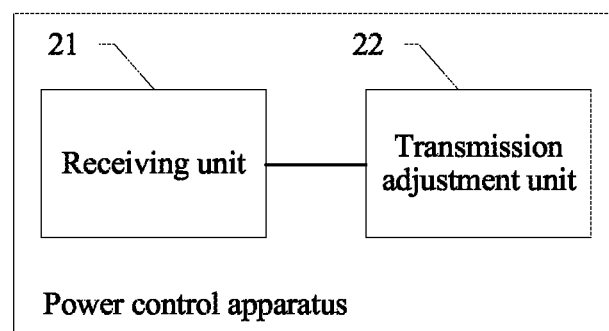
FIG. 2 is a schematic structural diagram of another power control apparatus according to an embodiment.

An embodiment provides another power control apparatus such as terminal device. A schematic structural diagram of the power control apparatus is shown in FIG. 2, and the power control apparatus includes a receiving unit 21 and a transmission adjustment unit 22.

The receiving unit 21 is configured to: receive a correspondence between a power control command sent by a base station and a serving cell of the power control apparatus and/or a correspondence between a power control command sent by a base station and a serving cell group of the power control apparatus, and receive, in one serving cell of the power control apparatus, multiple power control commands sent by the base station; or receive downlink control information in one serving cell of the power control apparatus, where the downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group.

A power control command in the multiple power control commands is used to instruct the power control apparatus to adjust transmit power of the power control apparatus in a serving cell and/or a serving cell group.

The transmission adjustment unit 22 is configured to determine, according to the correspondence or the downlink control information received by the receiving unit 21, the serving cells respectively corresponding to the multiple power control commands and/or the serving cell groups respectively corresponding to the multiple power control commands, and adjust, according to each power control command, transmit power of the power control apparatus in a corresponding serving cell and/or a corresponding serving cell group. Specifically, the transmission adjustment unit 22 transmits uplink information in a corresponding serving cell according to transmit power controlled and adjusted according to a power control command.

If the downlink control information received by the receiving unit 21 includes: the multiple power control commands and identifier information of one serving cell or identifier information of one serving cell group, the transmission adjustment unit 22 is specifically configured to determine that multiple power control commands are all used to instruct the power control apparatus to adjust transmit power in the serving cell and/or the serving cell group identified by the identifier information included in the downlink control information. If the downlink control information received by the receiving unit 21 includes: the multiple power control commands and identifier information of multiple serving cells and/or identifier information of multiple serving cell groups, the transmission adjustment unit 22 is specifically configured to determine that the power control commands are used to instruct the power control apparatus to adjust transmit power in the serving cells and/or the serving cell groups identified by the identifier information associated with the power control commands.

It can be learned that in this embodiment, a receiving unit 21 of a power control apparatus searches multiple power control commands in one serving cell of terminal device. However, in the prior art, a base station sends, to terminal device by respectively adding the commands to common search space of cells, commands used to instruct the terminal device to adjust PUCCH transmit power in all serving cells, and the terminal device performs detection in multiple serving cells. According to the apparatus in this embodiment, when the power control apparatus detects information sent by the base station to the power control apparatus, space that the power control apparatus needs to detect is reduced, thereby reducing a quantity of blind detection.

It should be noted that in a specific embodiment, a manner in which the transmission adjustment unit 22 performs adjustment according to the correspondence received by the receiving unit 21 may mainly include but is not limited to the following manners.

(1) The receiving unit 21 receives a first correspondence, where the first correspondence is a correspondence between identifier information of a power control command sent by the base station and identifier information of a serving cell of the power control apparatus and/or a correspondence between identifier information of a power control command sent by the base station and identifier information of a serving cell group of the power control apparatus. The receiving unit 21 receives, in one serving cell of the power control apparatus, the multiple power control commands sent by the base station and identifier information that is of the multiple power control commands and that is sent by the base station, or receives, in one serving cell of the power control apparatus, the multiple power control commands sent by the base station, where the power control commands include identifier information of the power control commands.

In this case, the transmission adjustment unit 22 determines, according to the first correspondence received by the receiving unit 21 and the identifier information of the received multiple power control commands, the serving cells respectively corresponding to the multiple power control commands and/or the serving cell groups respectively corresponding to the multiple power control commands, so as to determine a serving cell and/or a serving cell group in which the power control apparatus transmits uplink information at transmit power adjusted by using each power control command.

(2) When the receiving unit 21 receives a second correspondence, where the second correspondence is a correspondence between a scrambling code used by the base station to send a power control command and identifier information of a serving cell of the power control apparatus and/or a correspondence between a scrambling code used by the base station to send a power control command and identifier information of a serving cell group of the power control apparatus, the transmission adjustment unit 22 determines, according to the second correspondence received by the receiving unit 21 and scrambling codes respectively used by the receiving unit 21 to receive the multiple power control commands, the serving cells respectively corresponding to the multiple power control commands and/or the serving cell groups respectively corresponding to the multiple power control commands.

Specifically, when receiving a power control command, the receiving unit 21 uses a scrambling code to descramble the power control command received by the receiving unit 21. If descrambling is correctly performed, the scrambling code used during the descrambling is a scrambling code used by the receiving unit 21 to receive the power control command.

(3) When the receiving unit 21 receives a third correspondence, where the third correspondence is a correspondence between information about a resource used by the base station to send a power control command and identifier information of a serving cell of the power control apparatus and/or a correspondence between information about a resource used by the base station to send a power control command and identifier information of a serving cell group of the power control apparatus, the transmission adjustment unit 22 is specifically configured to determine, according to the third correspondence received by the receiving unit 21 and resources used by the receiving unit 21 to receive the multiple power control commands, the serving cells respectively corresponding to the multiple power control commands and/or the serving cell groups respectively corresponding to the multiple power control commands.

(4) The receiving unit 21 receives a fourth correspondence, where the fourth correspondence is a correspondence between location information that is of a power control command and that is in the downlink control information sent by the base station and identifier information of a serving cell of the power control apparatus and/or a correspondence between location information that is of a power control command and that is in the downlink control information sent by the base station and identifier information of a serving cell group of the power control apparatus. The receiving unit 21 receives downlink control information in one serving cell of the power control apparatus, where the downlink control information includes the multiple power control commands.

The transmission adjustment unit 22 is specifically configured to determine, according to the fourth correspondence received by the receiving unit 21 and location information that is of the multiple power control commands and is in the downlink control information and that is received by the receiving unit 21, the serving cells respectively corresponding to the multiple power control commands and/or the serving cell groups respectively corresponding to the multiple power control commands.

Figure 3:
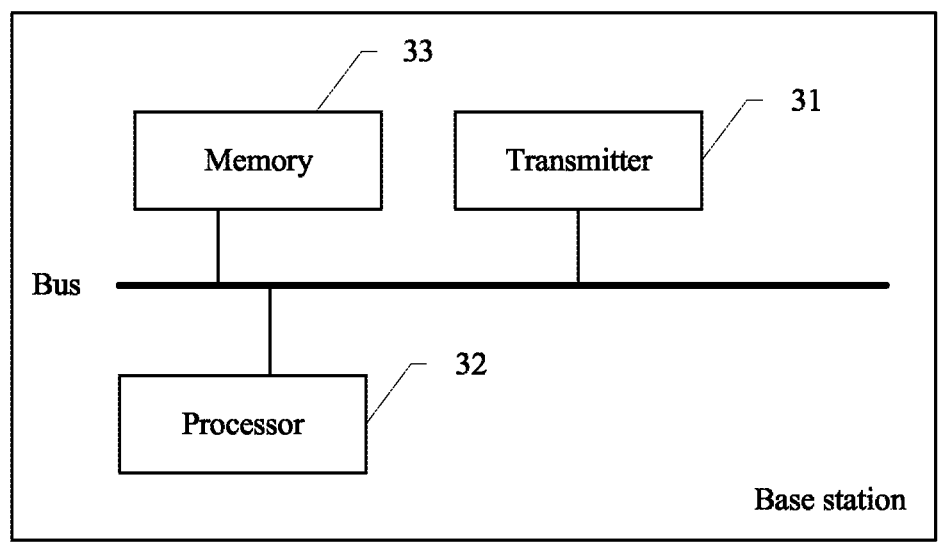
FIG. 3 is a schematic structural diagram of a base station according to an embodiment.

An embodiment provides a base station, and the base station is a specific embodiment of the power control apparatus shown in FIG. 1. A schematic structural diagram of the base station is shown in FIG. 3, and the base station includes a transmitter 31 and a processor 32 that are separately connected to a bus, and may further include a memory 33.

The memory 33 is configured to store information such as a necessary file required by the processor 32 to process data, for example, store program information used by the processor 32 to execute the power control method in this embodiment.

The processor 32 is mainly configured to invoke a program code in the memory 33 to implement a specific function. Specifically, in this embodiment, the following functions may be implemented: generating a correspondence between a power control command and a serving cell of terminal device and/or a correspondence between a power control command and a serving cell group of terminal device; or generating downlink control information, where the downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group.

The processor 32 is configured to: if the correspondence is generated, control the transmitter 31 to send the correspondence and control the transmitter 31 to send multiple power control commands in one serving cell of the terminal device according to the correspondence. The processor 32 is configured to: if the downlink control information is generated, control the transmitter 31 to send the downlink control information in one serving cell of the terminal device.

A power control command in the multiple power control commands is used to instruct the terminal device to adjust transmit power of the terminal device in a serving cell and/or a serving cell group, and different power control commands are used to instruct the terminal device transmit power of the terminal device in different serving cells and/or different serving cell groups.

If the downlink control information generated by the processor 32 includes identifier information of one serving cell or identifier information of one serving cell group, the multiple power control commands are all used to instruct the terminal device to adjust transmit power of the terminal device in the serving cell or the serving cell group identified by the identifier information. If the downlink control information generated by the processor 32 includes: the multiple power control commands and identifier information of multiple serving cells and/or identifier information of multiple serving cell groups, and each power control command is associated with identifier information of one serving cell and/or identifier information of one serving cell group. For example, identifier information and a power control command are adjacently associated. In this way, a power control command is used to instruct the terminal device to adjust transmit power in a serving cell and/or a serving cell group identified by identifier information associated with the power control command.

In this way, when detecting information sent by a base station to terminal device, the terminal device performs detection in only one serving cell of the terminal device. However, in the prior art, the base station sends, to the terminal device by adding a command to common search space of each cell, the command for instructing the terminal device to adjust PUCCH transmit power in each serving cell, and the terminal device performs detection in multiple serving cells. According to the base station in this embodiment, space that the terminal device needs to detect can be reduced, thereby reducing a quantity of blind detection.

The correspondence is information indicating that a specific power control command sent by the transmitter 31 is used to control transmit power at which the terminal device transmits uplink information in a specific serving cell and/or a specific serving cell group. The terminal device can transmit the uplink information in only one serving cell in a serving cell group. The uplink information herein may be information such as a PUCCH, or an SRS and a PUSCH. In addition, the transmitter 31 sends the multiple power control commands or the generated downlink control information in one serving cell, specifically, may send the power control commands in a part of resources, such as common search space, of one serving cell of the terminal device, and specifically, may send the power control commands in common search space of a primary cell of the terminal device.

It should be noted that in a specific embodiment, a manner in which the transmitter 31 sends the correspondence and the multiple power control commands may include but is not limited to the following manners.

(1) The processor 32 is specifically configured to generate a first correspondence, where the first correspondence is a correspondence between identifier information (such as a number) of a power control command sent by the base station and identifier information of a serving cell of the terminal device and/or a correspondence between identifier information of a power control command sent by the base station and identifier information of a serving cell group of the terminal device. In this case, the processor 32 controls the transmitter 31 to send the first correspondence and controls the transmitter 31 to send multiple power control commands and identifier information of the multiple power control commands in one serving cell of the terminal device according to the first correspondence; or controls the transmitter 31 to send multiple power control commands in one serving cell of the terminal device, where the power control commands include identifier information of the power control commands. For example, the multiple power control commands are numbered according to a sending sequence, and numbers are used as the identifier information of the power control commands.

(2) The processor 32 is specifically configured to generate a second correspondence, where the second correspondence is a correspondence between a scrambling code used by the base station to send a power control command and identifier information of a serving cell of the terminal device and/or a correspondence between a scrambling code used by the base station to send a power control command and identifier information of a serving cell group of the terminal device.

In this case, the processor 32 specifically controls the transmitter 31 to send the second correspondence and controls the transmitter 31 to send, according to the second correspondence sent by the transmitter 31, the multiple power control commands in one serving cell of the terminal device by using scrambling codes corresponding to the multiple power control commands, that is, send different power control commands by using different scrambling codes. Specifically, a CRC code is first obtained by using a power control command, and then a scrambled CRC code is obtained by specific calculation (generally, exclusive OR calculation) performed on the CRC code by using a scrambling code corresponding to the power control command, and finally, the power control command and the scrambled CRC code are sent.

(3) The processor 32 is specifically configured to generate a third correspondence, where the third correspondence is a correspondence between information about a resource used by the base station to transmit a power control command and identifier information of a serving cell of the terminal device and/or a correspondence between information about a resource used by the base station to transmit a power control command and identifier information of a serving cell group of the terminal device. In this way, the processor 32 controls the transmitter 31 to send the third correspondence and controls the transmitter 31 to respectively send, according to the third correspondence sent by the transmitter 31, the multiple power control commands in one serving cell of the terminal device by using resources corresponding to the multiple power control commands, that is, send different power control commands on different resources.

(4) The processor 32 is specifically configured to generate a fourth correspondence, where the fourth correspondence is a correspondence between location information that is of a power control command and that is in the downlink control command sent by the base station and identifier information of a serving cell of the terminal device and/or a correspondence between location information that is of a power control command and that is in the downlink control information sent by the base station and identifier information of a serving cell group of the terminal device. In this way, the processor 32 controls the transmitter 31 to send the fourth correspondence and controls the transmitter 31 to send the downlink control information in one serving cell of the terminal device according to the fourth correspondence sent by the transmitter 31. The downlink control command includes the multiple power control commands. That is, the processor 32 controls the transmitter 31 to send the multiple power control commands according to the location information in the fourth correspondence.

It should be noted that the processor 32 may control the transmitter 31 to send instruction information in a manner combining the foregoing four manners.

Figure 4:
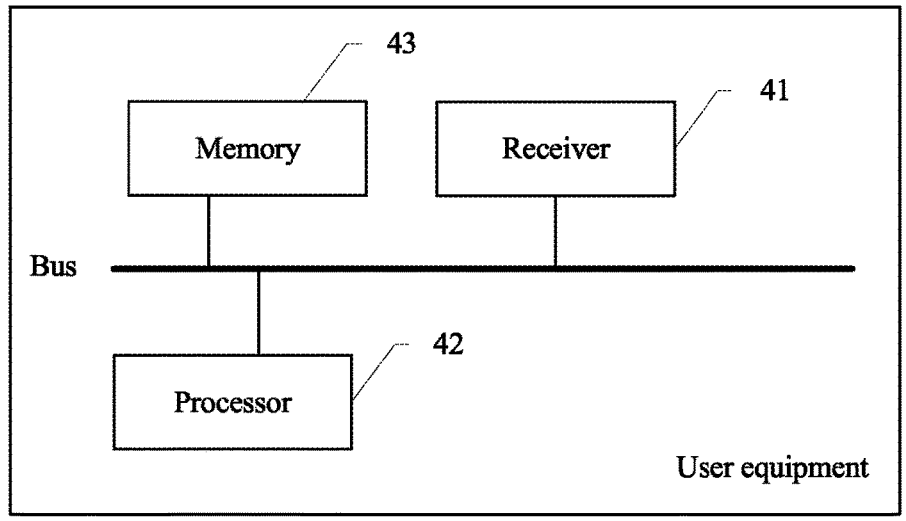
FIG. 4 is a schematic structural diagram of a terminal device according to an embodiment.

An embodiment provides terminal device, and the terminal device is a specific implementation manner of the power control apparatus shown in FIG. 2. A schematic structural diagram of the terminal device is shown in FIG. 4, and the terminal device includes a receiver 41 and a processor 42 that are separately connected to a bus, and may further include a memory 43.

The memory 43 is configured to store information such as a necessary file required by the processor 42 to process data, for example, store program information used by the memory 42 to execute the power control method in this embodiment.

The receiver 41 is configured to receive a correspondence between a power control command sent by a base station and a serving cell of the terminal device and/or a correspondence between a power control command sent by a base station and a serving cell group of the terminal device, and receive, in one serving cell of the terminal device, multiple power control commands sent by the base station. A power control command in the multiple power control commands is used to instruct the terminal device to adjust transmit power of the terminal device in a serving cell and/or a serving cell group. Alternatively, the receiver 41 is configured to receive downlink control information in one serving cell of the terminal device, where the downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group.

The processor 42 is mainly configured to invoke a program code in the memory 43 to implement a specific function. Specifically, in this embodiment, the serving cells respectively corresponding to the multiple power control commands and/or the serving cell group respectively corresponding to the multiple power control commands are determined according to the correspondence or the downlink control information received by the receiver 41, and then transmit power of the terminal device in a corresponding serving cell and/or a corresponding serving cell group is adjusted according to each power control command. Specifically, the processor 42 transmits uplink information in a corresponding serving cell according to transmit power controlled and adjusted according to a power control command.

If the downlink control information received by the receiver 41 includes: the multiple power control commands and identifier information of one serving cell or identifier information of one serving cell group, the processor 42 is specifically configured to determine that multiple power control commands are all used to instruct the terminal device to adjust transmit power in the serving cell and/or the serving cell group identified by the identifier information included in the downlink control information. If the downlink control information received by the receiver 41 includes: the multiple power control commands and identifier information of multiple serving cells and/or identifier information of multiple serving cell groups, the processor 42 is specifically configured to determine that the power control commands are used to instruct the terminal device to adjust transmit power in the serving cells and/or the serving cell groups identified by the identifier information associated with the power control commands.

It can be learned that in this embodiment, terminal device searches multiple power control commands in one serving cell of the terminal device. However, in the prior art, a base station sends, to the terminal device by adding a command to common search space of each cell, the command for instructing the terminal device to adjust PUCCH transmit power in each serving cell, and the terminal device performs detection in multiple serving cells. When the terminal device in this embodiment detects information sent by the base station to the terminal device, space that the terminal device needs to detect is reduced, thereby reducing a quantity of blind detection.

It should be noted that in a specific embodiment, a manner in which the processor 42 performs adjustment according to the correspondence received by the receiver 41 may mainly include but is not limited to the following manners.

(1) The receiver 41 receives a first correspondence, where the first correspondence is a correspondence between identifier information of a power control command sent by the base station and identifier information of a serving cell of the terminal device and/or a correspondence between identifier information of a power control command sent by the base station and identifier information of a serving cell group of the terminal device. The receiver 41 receives the multiple power control commands and identifier information of the multiple power control commands in one serving cell of the terminal device, or receives, in one serving cell of the terminal device, the multiple power control commands sent by the base station, where the power control commands include identifier information of the power control commands. In this case, the processor 42 determines, according to the identifier information of the multiple power control commands and the first correspondence that are received by the receiver 41, the serving cells respectively corresponding to the multiple power control commands and/or the serving cell groups respectively corresponding to the multiple power control commands, so as to determine a serving cell and/or a serving cell group in which the terminal device transmits uplink information at transmit power adjusted by using each power control command.

(2) When the receiver 41 receives a second correspondence, where the second correspondence is a correspondence between a scrambling code used by the base station to send a power control command and identifier information of a serving cell of the terminal device and/or a correspondence between a scrambling code used by the base station to send a power control command and identifier information of a serving cell group of the terminal device, the processor 42 determines, according to the second correspondence received by the receiver 41 and scrambling codes respectively used by the receiver 41 to receive the multiple power control commands, the serving cells respectively corresponding to the multiple power control commands and/or the serving cell groups respectively corresponding to the multiple power control commands.

Specifically, after the receiver 41 receives a power control command, the processor 43 uses a scrambling code to descramble the power control command received by the receiver 41. If descrambling is correctly performed, the scrambling code used during the descrambling is a scrambling code used by the receiver 41 to receive the power control command.

(3) When the receiver 41 receives a third correspondence, where the third correspondence is a correspondence between information about a resource used by the base station to send a power control command and identifier information of a serving cell of the terminal device and/or a correspondence between information about a resource used by the base station to send a power control command and identifier information of a serving cell group of the terminal device, the processor 42 is specifically configured to determine, according to the third correspondence received by the receiver 41 and resources respectively used by the receiver 41 to receive the multiple power control commands, the serving cells respectively corresponding to the multiple power control commands and/or the serving cell groups respectively corresponding to the multiple power control commands.

(4) When the receiver 41 receives a fourth correspondence, where the fourth correspondence is a correspondence between location information that is of a power control command and that is in the downlink control information sent by the base station and identifier information of a serving cell of the terminal device and/or a correspondence between location information that is of a power control command and that is in the downlink control information sent by the base station and identifier information of a serving cell group of the terminal device, the receiver 41 receives the downlink control information in one serving cell of the terminal device, where the downlink control information includes the multiple power control commands.

The processor 42 is specifically configured to determine, according to the fourth correspondence received by the receiver 41 and location information that is of the multiple power control commands and is in the downlink control information and that is received by the receiver 41, the serving cells respectively corresponding to the multiple power control commands and/or the serving cell groups respectively corresponding to the multiple power control commands.

Embodiments further provide a power control system, including a base station and terminal device. The terminal device has multiple serving cells at a same time, and the base station may provide multiple serving cells for the terminal device.

A structure of the base station in this system may be shown in a structure of the power control apparatus shown in FIG. 1 or a structure of the base station shown in FIG. 3. A structure of the terminal device in this system may be shown in a structure of the power control apparatus shown in FIG. 2 or a structure of the terminal device shown in FIG. 4, and details are not described herein.

Figure 5:
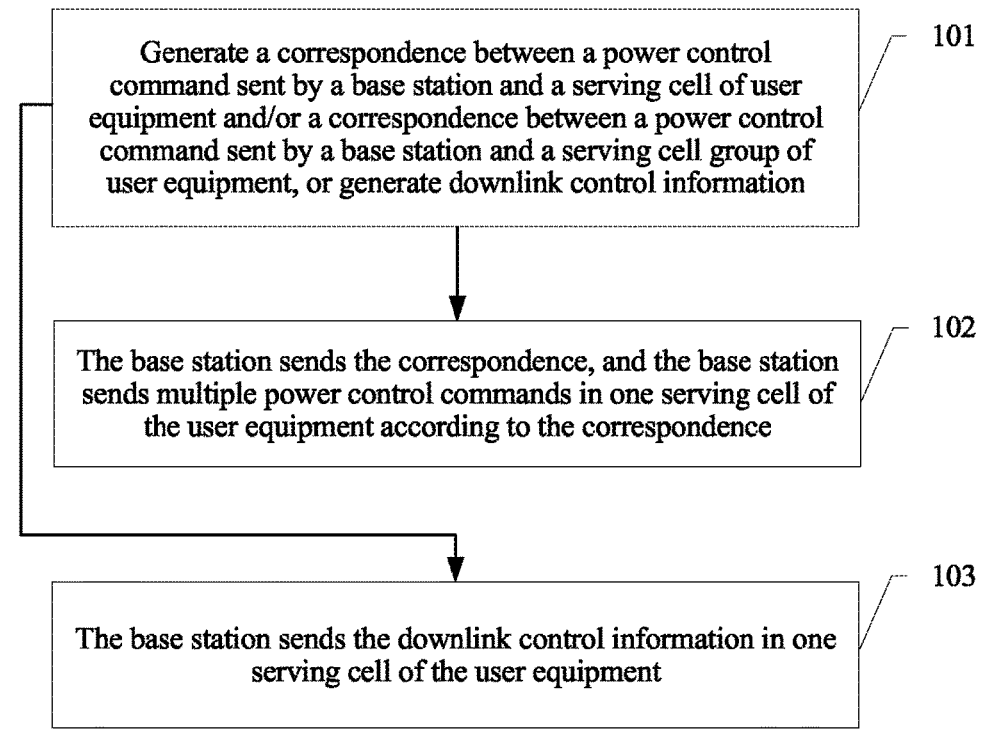
FIG. 5 is a flowchart of a power control method according to an embodiment.

An embodiment provides a power control method, which is mainly applied to a mobile communications system. Terminal device transmits uplink information by using multiple serving cells, and a base station controls, by using a power control command, transmit power at which the terminal device transmits the uplink information in each serving cell in the base station. The method of this embodiment is a method executed by the base station in the system, and a flowchart of the method is shown in FIG. 5, and the method includes the following steps.

Step 101. The base station generates a correspondence between a power control command sent by the base station and a serving cell of the terminal device and/or a correspondence between a power control command sent by the base station and a serving cell group of the terminal device; or the base station generates downlink control information, where the downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or one serving cell group.

If the base station adds the multiple power control commands and identifier information of a serving cell and/or a serving cell group to the downlink control information for sending, the multiple power control commands are all used to instruct the terminal device to adjust transmit power of the terminal device in the serving cell and/or the serving cell group identified by the identifier information. If the base station respectively associates identifier information of multiple serving cells and/or identifier information of multiple serving cell groups with the multiple power control commands, and adds the multiple power control commands to the downlink control information for sending, the power control commands are used to instruct the terminal device to adjust transmit power of the terminal device in the serving cells and/or the serving cell groups identified by the identifier information associated with the power control commands.

If the base station generates the correspondence, the base station performs step 102, or if the base station generates the downlink control information, the base station performs step 103.

Step 102. The base station sends the correspondence between a power control command and a serving cell of the terminal device and/or the correspondence between a power control command and a serving cell group of the terminal device, and the base station sends multiple power control commands in one serving cell of the terminal device according to the correspondence.

Step 103. The base station sends the downlink control information in one serving cell of the terminal device.

A power control command in the multiple power control commands is used to instruct the terminal device to adjust transmit power of the terminal device in a serving cell and/or a serving cell group, and different power control commands are used to instruct the terminal device transmit power of the terminal device in different serving cells and/or different serving cell groups. The terminal device uses specific transmit power to send any piece of the following information: a physical uplink control channel, a sounding reference signal, a physical uplink shared channel, or the like. The base station may specifically send the multiple power control commands in common search space of a primary cell of the terminal device.

It can be learned that in the method of this embodiment, a base station sends power control commands of multiple serving cells in one serving cell of terminal device, so that when detecting information sent by the base station to the terminal device, the terminal device performs detection in only one serving cell of the terminal device. However, in the prior art, the base station sends, to the terminal device by adding a command to common search space of each cell, the command for instructing the terminal device to adjust PUCCH transmit power in each serving cell, and the terminal device performs detection in multiple serving cells. According to the method in this embodiment, space that the terminal device needs to detect can be reduced, thereby reducing a quantity of blind detection.

In a specific embodiment, a manner in which the base station performs step 101 and step 102 may include but is not limited to the following manners.

(1) When the base station performs step 101, the base station generates a first correspondence, where the first correspondence is a correspondence between identifier information of a power control command sent by the base station and identifier information of a serving cell of the terminal device and/or a correspondence between identifier information of a power control command sent by the base station and identifier information of a serving cell group of the terminal device. When performing step 102, that is, when sending multiple power control commands in one serving cell of the terminal device according to the first correspondence, the base station further needs to send the identifier information of the multiple power control commands; or send the multiple power control commands in one serving cell of the terminal device, where the power control commands include the identifier information of the power control commands.

(2) When the base station performs step 101, the base station generates a second correspondence, where the second correspondence is a correspondence between a scrambling code used by the base station to send a power control command and identifier information of a serving cell of the terminal device and/or a correspondence between a scrambling code used by the base station to send a power control command and identifier information of a serving cell group of the terminal device. When the base station performs step 102, the base station respectively sends, according to the second correspondence, multiple power control commands in one serving cell of the terminal device by using scrambling codes corresponding to the multiple power control commands, that is, sends different power control commands by using different scrambling codes.

(3) When the base station performs step 101, the base station generates a third correspondence, where the third correspondence is a correspondence between information about a resource used by the base station to send a power control command and identifier information of a serving cell of the terminal device and/or a correspondence between information about a resource used by the base station to send a power control command and identifier information of a serving cell group of the terminal device. When the base station performs step 102, the base station respectively sends, according to the third correspondence, multiple power control commands in one serving cell of the terminal device by using resources corresponding to the multiple power control commands, that is, sends different power control commands by using different resources.

(4) When the base station performs step 101, the base station generates a fourth correspondence, where the fourth correspondence is a correspondence between location information that is of a power control command and that is in the downlink control information sent by the base station and identifier information of a serving cell of the terminal device and/or a correspondence between location information that is of a power control command and that is in the downlink control information sent by the base station and identifier information of a serving cell group of the terminal device. When the base station performs step 102, the base station sends the downlink control information in one serving cell of the terminal device according to the fourth correspondence, where the downlink control information includes multiple power control commands, and locations of the multiple power control commands in the downlink control command comply with the fourth correspondence.

It should be noted that when performing step 101, the base station may generate a correspondence in a manner combining the foregoing manner (1) to manner (4).

An embodiment provides another power control method, which is mainly applied to a mobile communications system. Terminal device transmits uplink information by using multiple serving cells, and a base station controls, by using a power control command, transmit power at which the terminal device transmits the uplink information in each serving cell in the base station. The method of this embodiment is executed by the terminal device in the system, and a flowchart of the method is shown in FIG. 6. The method includes step 201 and step 203, or includes step 202 and step 203.

Step 201. The terminal device receives a correspondence between a power control command sent by the base station and a serving cell of the terminal device and/or a correspondence between a power control command sent by the base station and a serving cell group of the terminal device, and receives, in one serving cell of the terminal device, multiple power control commands sent by the base station.

Step 202. The terminal device receives, in one serving cell of the terminal device, a downlink control command sent by the base station, where the downlink control information includes: multiple power control commands and identifier information of serving cells respectively corresponding to the multiple power control commands and/or identifier information of serving cell groups respectively corresponding to the multiple power control commands, or the downlink control information includes: multiple power control commands and identifier information of one serving cell and/or identifier information of one serving cell group.

A power control command in the multiple power control commands is used to instruct the terminal device to adjust transmit power of the terminal device in a serving cell and/or a serving cell group.

Step 203. The terminal device determines, according to the correspondence received in step 201 or downlink control information received in step 202, the serving cells respectively corresponding to the multiple power control commands received by the terminal device and/or the serving cell groups respectively corresponding to the multiple power control commands received by the terminal device, and then adjusts, according to the power control commands, transmit power of the terminal device in the corresponding serving cells and/or the corresponding serving cell groups.

If the terminal device receives the downlink control information and the downlink control information includes: multiple power control commands and identifier information of a serving cell and/or identifier information of a serving cell group, when the terminal device performs step 203 of determining the serving cells respectively corresponding to the multiple power control commands and/or the serving cell groups respectively corresponding to the multiple power control commands, the terminal device directly determines that the multiple power control commands are corresponding to the serving cell and/or the serving cell group and are all used to instruct the terminal device to adjust transmit power of the terminal device in the serving cell and/or the serving cell group identified by the identifier information included in the downlink control information. If the terminal device receives the downlink control information and the downlink control information includes: multiple power control commands and identifier information of multiple serving cells and/or identifier information of multiple serving cell groups, when the terminal device performs step 203 of determining the serving cells respectively corresponding to the multiple power control commands and/or the serving cell groups respectively corresponding to the multiple power control commands, the terminal device directly determines that the power control commands included in the downlink control information are used to instruct the terminal device to adjust transmit power in serving cells identified by identifier information associated with the power control commands and/or serving cell groups identified by identifier information associated with the power control commands.

In this embodiment, terminal device detects power control commands in only one serving cell of the terminal device. However, in the prior art, a base station sends, to the terminal device by adding a command to common search space of each cell, the command for instructing the terminal device to adjust PUCCH transmit power in each serving cell, and the terminal device performs detection in multiple serving cells. According to the method in this embodiment, when the terminal device detects information sent by the base station to the terminal device, space for the detection is reduced, thereby reducing a quantity of blind detection.

In a specific embodiment, the terminal device may specifically implement step 201 and step 203 in the following manners.

(1) When the terminal device performs step 201, the terminal device receives a first correspondence, where the first correspondence is a correspondence between identifier information of a power control command sent by the base station and identifier information of a serving cell of the terminal device and/or a correspondence between identifier information of a power control command sent by the base station and identifier information of a serving cell group of the terminal device. When the terminal device performs step 202, the terminal device receives, in one serving cell, the multiple power control commands sent by the base station and identifier information that is of the multiple power control commands and that is sent by the base station, or receives, in one serving cell of the terminal device, the multiple power control commands sent by the base station, where the power control commands include identifier information of the power control commands.

When the terminal device performs step 203 of determining, according to the correspondence, the serving cells respectively corresponding to the multiple power control commands and/or the serving cell groups respectively corresponding to the multiple power control commands, the terminal device determines, according to the first correspondence received in step 201 and the identifier information of the multiple power control commands, the serving cells respectively corresponding to the multiple power control commands received in step 201 and/or the serving cell groups respectively corresponding to the multiple power control commands received in step 201.

(2) When the terminal device performs step 201, the terminal device receives a second correspondence, where the second correspondence is a correspondence between a scrambling code used by the base station to send a power control command and identifier information of a serving cell of the terminal device and/or a correspondence between a scrambling code used by the base station to send a power control command and identifier information of a serving cell group of the terminal device. When the terminal device performs step 203 of determining, according to the correspondence, the serving cells respectively corresponding to the multiple power control commands and/or the serving cell groups respectively corresponding to the multiple power control commands, the terminal device determines, according to the second correspondence and scrambling codes respectively used by the terminal device to receive the multiple power control commands, the serving cells respectively corresponding to the multiple power control commands and/or the serving cell groups respectively corresponding to the multiple power control commands. Specifically, the terminal device descrambles a received power control command according to a scrambling code in the second correspondence. If descrambling is correctly performed, a power control command obtained by means of the descrambling is corresponding to a serving cell and/or a serving cell group corresponding to the scrambling code used during the descrambling.

A process in which the terminal device performs descrambling and a process in which the terminal device performs scrambling are mutually inverse, and details are not described herein.

(3) When the terminal device performs step 201, the terminal device receives a third correspondence, where the third correspondence is a correspondence between information about a resource used by the base station to send a power control command and identifier information of a serving cell of the terminal device and/or a correspondence between information about a resource used by the base station to send a power control command and identifier information of a serving cell group of the terminal device. When the terminal device performs step 203 of determining, according to the correspondence, the serving cells respectively corresponding to the multiple power control commands and/or the serving cell groups respectively corresponding to the multiple power control commands, the terminal device determines, according to the third correspondence and resources used by the terminal device to receive the multiple power control commands in step 201, a serving cell and/or a serving cell group corresponding to each power control command.

(4) When the terminal device performs step 201, the terminal device receives a fourth correspondence, where the fourth correspondence is a correspondence between location information that is of a power control command and that is in the downlink control information sent by the base station and identifier information of a serving cell of the terminal device and/or a correspondence between location information that is of a power control command and that is in the downlink control information sent by the base station and identifier information of a serving cell group of the terminal device. When performing step 202 of receiving the multiple power control commands, the terminal device specifically receives the downlink control information in one serving cell of the terminal device, where the downlink control information includes multiple power control commands, and locations that are of the multiple power control commands and that are in the downlink control information comply with the fourth correspondence.

When the terminal device performs step 203 of determining the serving cells respectively corresponding to the multiple power control commands and/or the serving cell groups respectively corresponding to the multiple power control commands, the terminal device determines, according to the fourth correspondence and the locations that are of the received multiple power control commands and that are in the downlink control information, the serving cells respectively corresponding to the multiple power control commands and/or the serving cell groups respectively corresponding to the multiple power control commands.

The following describes the power control method in embodiments by using specific embodiments. In these embodiments, uplink information transmitted by terminal device is a PUCCH, multiple power control commands sent by a base station is sent in common search space of a primary cell to which the terminal device belongs, and the power control commands are TPC commands.

Embodiment 1

A base station adds multiple TPC commands to one piece of downlink control information DCI and sends, to terminal device, the multiple TPC commands in common search space of a primary cell to which the terminal device belongs. The multiple TPC commands include a TPC command used for adjusting transmit power at which the terminal device transmits a PUCCH in the primary cell and a TPC command used for adjusting transmit power at which the terminal device separately transmits the PUCCH in multiple secondary cells.

A format of the DCI sent by the base station may be shown in FIG. 7. All TPC commands are connected head to tail, each TPC command is given a number that is used to indicate a location of the TPC command in the DCI, and the number is identifier information of the TPC command. For example, a number of a TPC command ranked in the first place is 1, and the TPC command may be referred to as a TPC command 1, a number of a TPC command ranked in the second place is 2, and the TPC command may be referred to as a TPC command 2, and so on. When sending a TPC command, the base station may associate a number of the TPC command with the TPC command, add the number of the TPC command and the TPC command to the DCI, and send the DCI to the terminal device.

In another case, when the base station sends a TPC command, a number of the TPC command is not included in the DCI and not sent to the terminal device. However, all TPC commands included in the DCI have a same length, and the terminal device itself determines a number of a TPC command according to a location of the TPC command in the DCI. For example, if a length of DCI received by the terminal device is 10 bits, and a length of each TPC command included in the DCI is 2 bits, after receiving the DCI, the terminal device itself can determine that the first 2 bits of the DCI are a TPC command numbered 1, the third bit and the fourth bit of the DCI are a TPC command numbered 2, and so on. Before sending the DCI, the base station sends, to the terminal device in advance, a correspondence between numbers of some TPC commands in the DCI and identifier information of cells in which the terminal device sends the PUCCH, so that the terminal device can learn that a specific TPC command in the DCI is used for adjusting transmit power at which the terminal device transmits the PUCCH in a specific cell.

For example, if the base station notifies the terminal device in advance that a TPC command numbered x (also referred to as a TPC command x) is used for adjusting transmit power at which the terminal device transmits the PUCCH in a primary cell, a TPC command numbered y (also referred to as a TPC command y) is used for adjusting transmit power at which the terminal device transmits the PUCCH in a first PSCell, and a TPC command numbered z (also referred to as a TPC command z) is used for adjusting transmit power at which the terminal device transmits the PUCCH in a second PSCell, after receiving a DCI, the terminal device uses the TPC command x to adjust the transmit power for transmitting the PUCCH in the primary cell, uses the TPC command y to adjust the transmit power for transmitting the PUCCH in the first PSCell, and uses the TPC command z to adjust the transmit power for transmitting the PUCCH in the second PSCell.

If a serving cell group to which the primary cell belongs is a first serving cell group, a serving cell group to which the first PSCell belongs is a second serving cell group, and a serving cell group to which the second PSCell belongs is a third serving cell group, the base station may also notify the terminal device in advance that the TPC command x is used for adjusting transmit power at which the terminal device transmits the PUCCH in the first serving cell group, the TPC command y is used for adjusting transmit power at which the terminal device transmits the PUCCH in the second serving cell group, and the TPC command z is used for adjusting transmit power at which the terminal device transmits the PUCCH in the third serving cell group.

Embodiment 2

A base station sends DCI in common search space of a primary cell, where the DCI includes multiple TPC commands and identifier information of one serving cell or identifier information of one serving cell group, so as to notify the terminal device of a serving cell in which the terminal device transmits the PUCCH at transmit power adjusted by using all TPC commands included in the DCI. When the DCI includes identifier information of multiple serving cells or identifier information of multiple serving cell groups, all identifier information needs to be associated with the TPC commands, so as to notify the terminal device that the TPC commands in the DCI are used for adjusting transmit power at which the terminal device transmits the PUCCH in an associated serving cell or serving cell group.

In a format of DCI shown in FIG. 8, the DCI includes identifier information of multiple serving cell groups. Identifier information of a first serving cell group is adjacent to, or is associated with a TPC command x and is used to notify the terminal device that the TPC command x is used for adjusting transmit power at which the terminal device transmits the PUCCH in a primary cell (the primary cell belongs to the first serving cell group). An identifier of a second serving cell group is used to notify the terminal device that a TPC command y associated with the identifier of the second serving cell group is used for adjusting transmit power at which the terminal device transmits the PUCCH in a first PSCell (the first PSCell belongs to the second serving cell group).

Embodiment 3

A base station sends, to terminal device in advance, scrambling codes used for sending multiple TPC commands. Different scrambling codes are used for sending TPC commands of different serving cells and/or TPC commands of different serving cell groups. Then, the base station sends, in common search space of a primary cell of the terminal device, the TPC commands of different serving cells and/or the TPC commands of different serving cell groups by using the different scrambling codes, so that the terminal device can obtain the TPC commands of different serving cells and/or the TPC commands of different serving cell groups by means of descrambling by using the different scrambling codes.

For example, the base station may notify the terminal device that the base station uses a first radio network temporary identifier (RNTI) as a scrambling code to send, a TPC command used for adjusting transmit power at which the terminal device transmits a PUCCH in a primary cell (the primary cell belong to a first serving cell group), and that the base station uses a second RNTI as a scrambling code to send, a TPC command used for adjusting transmit power at which the terminal device transmits a PUCCH in a first PSCell (the first PSCell belongs to a second serving cell group). The terminal device adjusts, by using the TPC command obtained by means of descrambling by using the first RNTI, the transmit power at which the terminal device transmits the PUCCH in the primary cell, and adjusts, by using the TPC command obtained by means of descrambling by using the second RNTI, the transmit power at which the terminal device transmits the PUCCH in the first PSCell.

Embodiment 4

A base station sends, to terminal device in advance, information about subframes/timeslots used for sending multiple TPC commands. Different subframes/timeslots are used for sending TPC commands of different serving cells and/or TPC commands of different serving cell groups. Then, the base station sends, in common search space of a primary cell of the terminal device, the TPC commands of different serving cells and/or the TPC commands of different serving cell groups by using the different subframes/timeslots, so that the terminal device can respectively receive the TPC commands of different serving cells and/or the TPC commands of different serving cell groups on the different subframes/timeslots.

For example, the base station may notify the terminal device that the base station sends, on an even subframe, a TPC command used for adjusting transmit power at which the terminal device transmits a PUCCH in a primary cell (the primary cell belong to a first serving cell group), and that the base station sends, on an odd subframe, a TPC command used for adjusting transmit power at which the terminal device transmits a PUCCH in a first PSCell (the first PSCell belongs to a second serving cell group). The terminal device adjusts, by using the TPC command received on the even subframe, the transmit power for transmitting the PUCCH in the primary cell, and adjusts, by using the TPC command received on the odd subframe, the transmit power for transmitting the PUCCH in the first PSCell.

Embodiment 5

A base station sends, to terminal device in advance, information about frequency resources/subcarriers used for sending multiple TPC commands. Different frequency resources/subcarriers are used for sending TPC commands of different serving cells and/or TPC commands of different serving cell groups. Then, the base station sends, in common search space of a primary cell of the terminal device, the TPC commands of different serving cells and/or the TPC commands of different serving cell groups by using the different frequency resources/subcarriers, so that the terminal device can respectively receive the TPC commands of different serving cells and/or the TPC commands of different serving cell groups on the different frequency resources/subcarriers.

Embodiment 6

A base station sends, to the terminal device in advance, information about time-frequency resources used for sending multiple TPC commands. Different time-frequency resources are used for sending TPC commands of different serving cells and/or TPC commands of different serving cell groups. Then, the base station sends, in common search space of a primary cell of the terminal device, the TPC commands of different serving cells and/or the TPC commands of different serving cell groups by using the different time-frequency resources, so that the terminal device can respectively receive the TPC commands of different serving cells and/or the TPC commands of different serving cell groups on the different time-frequency resources.

In another embodiment, the base station may control transmit power at which the terminal device transmits the PUCCH in a manner combining Embodiment 4 and Embodiment 5.

A person of ordinary skill in the art may understand that all or a part of the steps of the methods in the embodiments may be implemented by a program instructing relevant hardware. The program may be stored in a computer readable storage medium. The storage medium may include: a read only memory (ROM), a random access memory (RAM), a magnetic disk, or an optical disc.

The power control method, the communications system, and the related device that are provided in the embodiments are described in detail above. The principle and implementation of the present embodiments are described herein through specific examples. The description about the embodiments is merely provided to help understand the method and core ideas of the present embodiments. In addition, persons of ordinary skill in the art can make variations and modifications to the present embodiments in terms of the specific implementations and application scopes according to the ideas of the present embodiments. Therefore, the content of this specification shall not be construed as a limit to the present embodiments.

What is claimed is:

1. A power control apparatus, comprising:
a processor; and
a non-transitory computer readable storage medium storing a program for execution by the processor, the program including instructions to:
generate a correspondence between a power control command and a serving cell of a terminal device or a serving cell group of the terminal device
send the generated correspondence, and send multiple power control commands in one serving cell of the terminal device according to the correspondence generated by the power control apparatus, after generating the correspondence, wherein a power control command in the multiple power control commands instructs the terminal device to adjust transmit power of the terminal device in the serving cell or the serving cell group;
generate downlink control information, wherein the downlink control information comprises:
the multiple power control commands and one of identifier information of serving cells corresponding to the multiple power control commands or identifier information of serving cell groups corresponding to the multiple power control commands; or
the multiple power control commands and identifier information of one serving cell or of one serving cell group; and
send, in one serving cell of the terminal device, the downlink control information generated by the processor, after generating the downlink control information.

2. A power control apparatus, comprising:
a processor; and
a non-transitory computer readable storage medium storing a program for execution by the processor, the program including instructions to:
receive a correspondence between a power control command sent by a base station and a serving cell or a serving cell group of the power control apparatus;
receive, in one serving cell of the power control apparatus, multiple power control commands sent by the base station;
determine the serving cells or serving cell groups corresponding to the multiple power control commands according to the correspondence; and
adjust, according to the power control commands, transmit power of the power control apparatus in a corresponding serving cell or serving cell group, wherein a power control command in the multiple power control commands instructs the power control apparatus to adjust transmit power of the power control apparatus in the serving cell or the serving cell group; and
receive downlink control information in one serving cell of the power control apparatus, wherein the downlink control information comprises:
multiple power control commands and identifier information of serving cells corresponding to the multiple power control commands or identifier information of serving cell groups corresponding to the multiple power control commands; or
multiple power control commands and identifier information of one serving cell or of one serving cell group; and
wherein the instructions to determine the serving cells or serving cell groups corresponding to the multiple power control commands comprise instructions to determine the serving cells or serving cell groups corresponding to the multiple power control commands according to the downlink control information.

3. The power control apparatus according to claim 2, wherein the instructions further comprise instructions to receive the downlink control information in common search space of a primary cell of the power control apparatus.

4. A method, comprising:
generating, by a base station, a correspondence between a power control command sent by the base station and a serving cell of terminal device or a serving cell group of terminal devices; and
sending, by the base station, the correspondence and multiple power control commands in one serving cell of the terminal device according to the correspondence, in response to the correspondence being generated, wherein a power control command in the multiple power control commands instructs the terminal device to adjust transmit power of the terminal device in the serving cell or the serving cell group;

generating, by the base station, downlink control information, wherein the downlink control information comprises:

multiple power control commands and identifier information of serving cells or serving cell groups corresponding to the multiple power control commands; or multiple power control commands and identifier information of one serving cell or one serving cell group; and sending, by the base station, the downlink control information in one serving cell of the terminal device, in response to the downlink control information being generated.

5. A method, comprising:

receiving, by a terminal device, a correspondence between a power control command sent by a base station and a serving cell of the terminal device or a serving cell group of the terminal device;

receiving, in one serving cell, multiple power control commands sent by the base station;

determining the serving cells or the serving cell groups corresponding to the multiple power control commands, by the terminal device according to the correspondence; and adjusting, according to the power control commands, transmit power of the terminal device in the corresponding serving cells or the serving cell groups, wherein a power control command in the multiple power control commands instructs the terminal device to adjust transmit power of the terminal device in the serving cell or the serving cell group; and receiving, by the terminal device in one serving cell, downlink control information sent by the base station, wherein the downlink control information comprises:

multiple power control commands and identifier information of serving cells or serving cell groups corresponding to the multiple power control commands; or multiple power control commands and identifier information of one serving cell or identifier information of one serving cell group; and wherein determining the serving cells or the serving cell groups corresponding to the multiple power control commands comprises determining the serving cells or the serving cell groups corresponding to the multiple power control commands according to the downlink control information.

* * * * *